Sept. 9, 1952  N. ZUCK  2,609,875
CUTTING APPARATUS
Filed Oct. 7, 1948  3 Sheets-Sheet 2
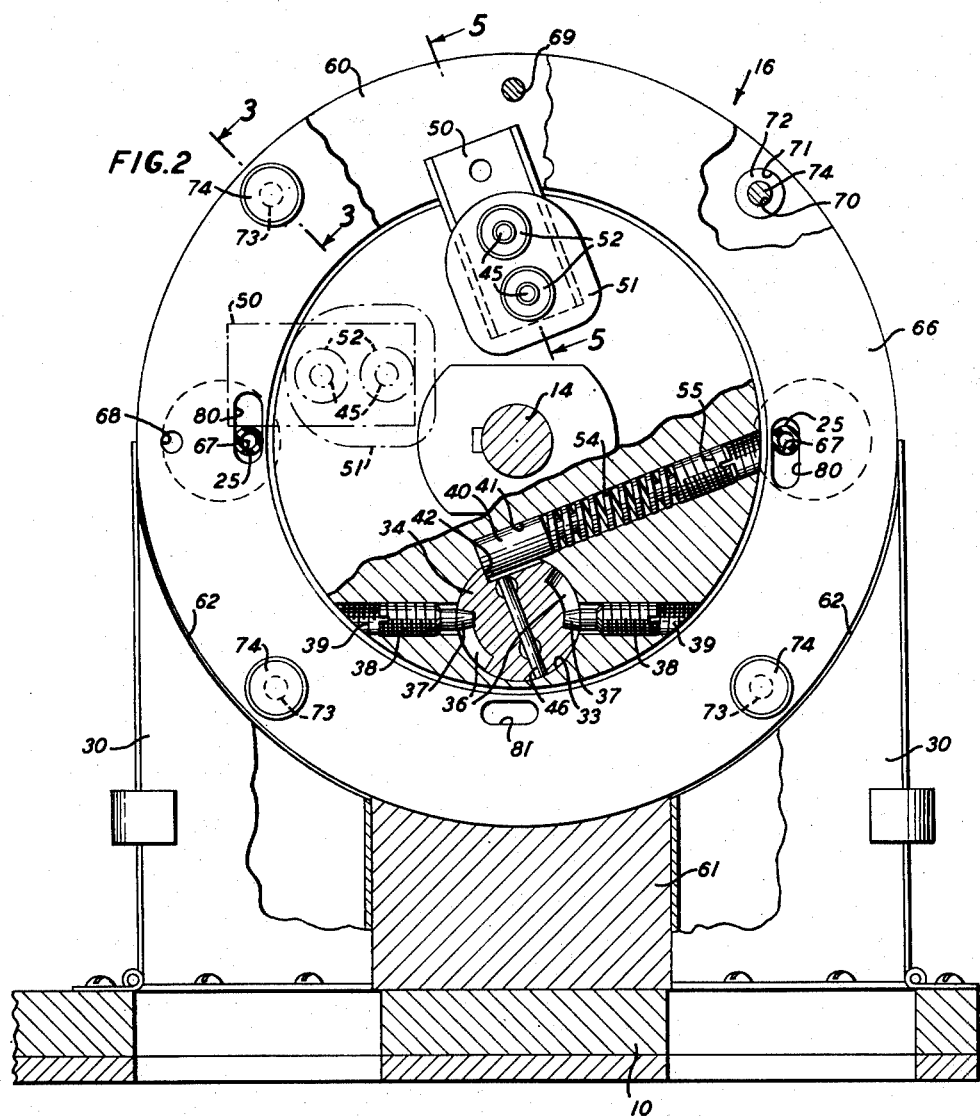
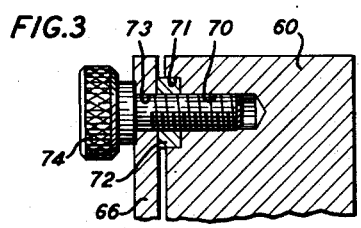
INVENTOR
N. ZUCK
BY
W.C.Parnell
ATTORNEY

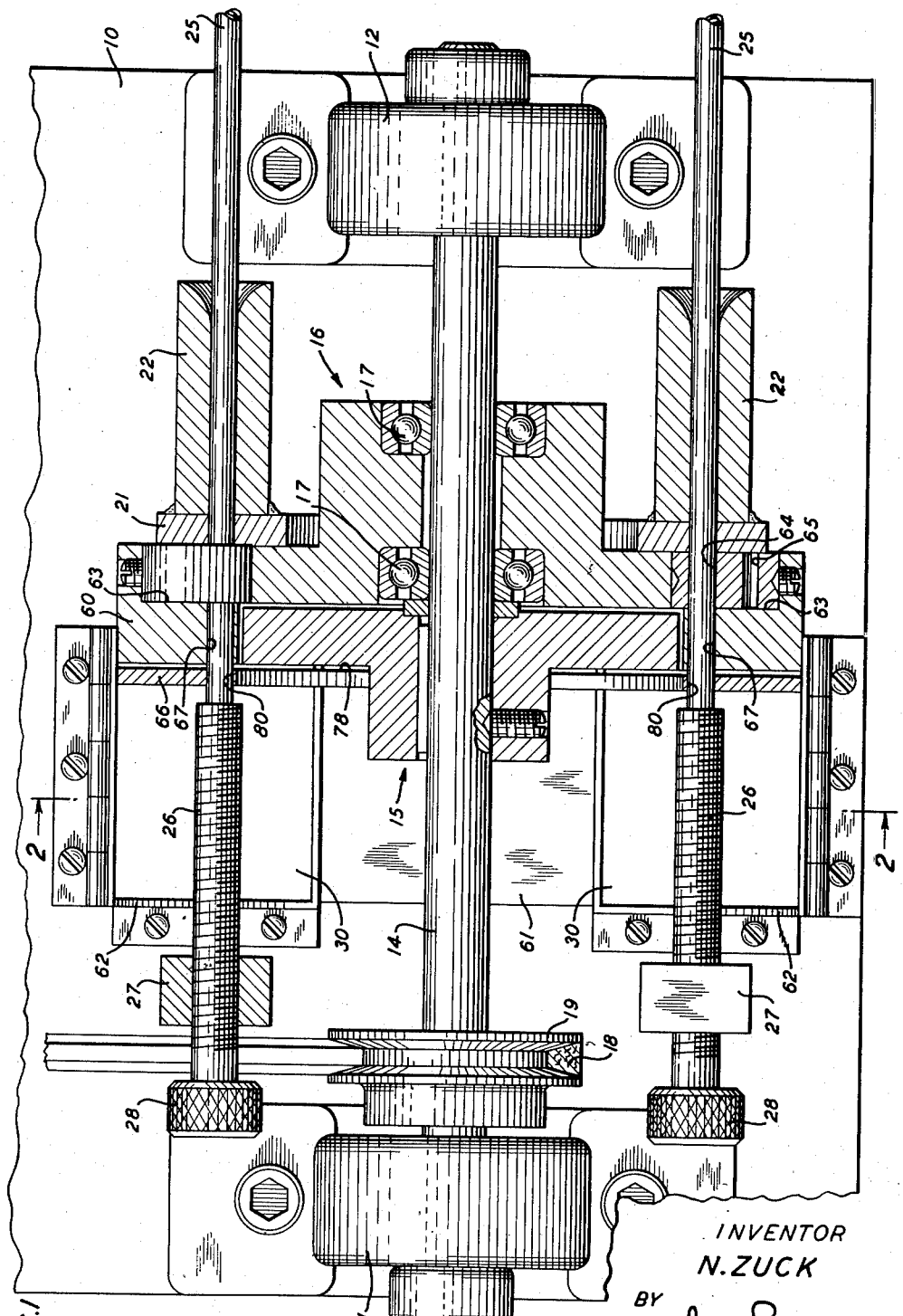

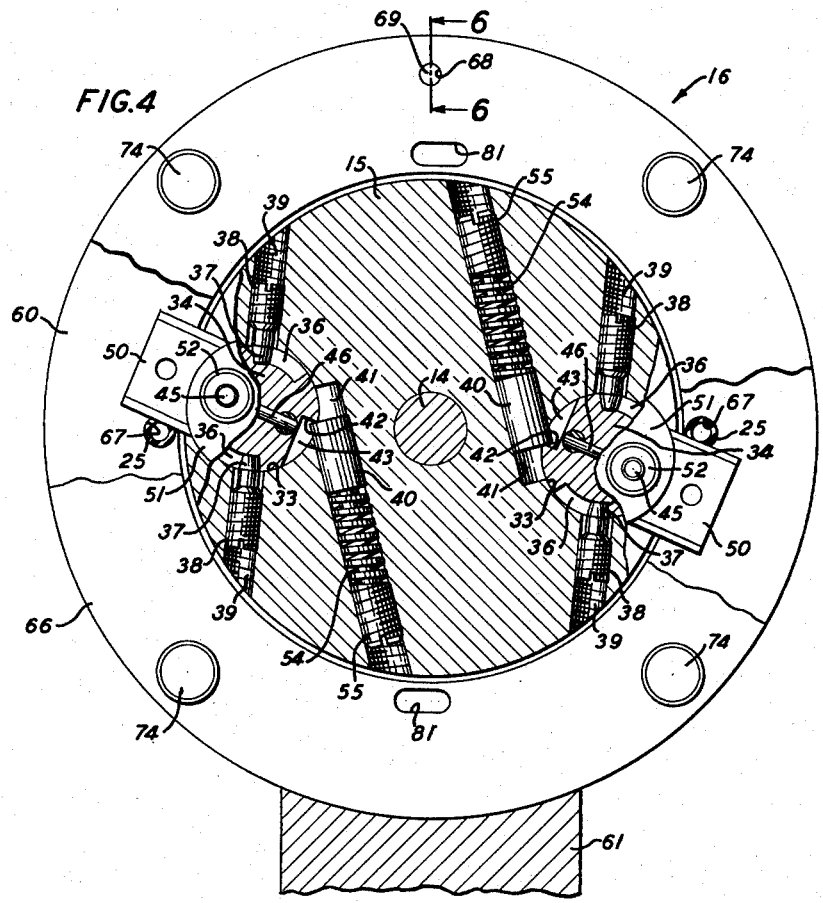

Patented Sept. 9, 1952

2,609,875

UNITED STATES PATENT OFFICE 2,609,875

CUTTING APPARATUS

Nicholas Zuck, Brooklyn, N. Y., assignor to Western Electric Company, Incorporated, New York, N. Y., a corporation of New York Application October 7, 1948, Serial No. 53,221

2 Claims. (Cl. 164—60)

This invention relates to cutting apparatus, and more particularly to apparatus for cutting elongate material into predetermined lengths during longitudinal advancement of the material.

In the manufacture of numerous electrical units for the communication arts, insulating bushings of predetermined variable lengths are cut from insulating materials such as cellulose acetate tubes. The length of the bushings is an important factor during the assembly of the electrical units including the bushings as parts thereof. Furthermore, it is essential that the bushings or lengths of the material be given a straight cut free of burrs or irregular edges so that they may accurately fit within the unit of which they are to be a part. It has been found that tubular material formed of cellulose acetate cannot be cut with any degree of accuracy by the commercially known cutting machines.

An object of the invention is to provide a cutting apparatus which is simple in structure and highly efficient in operation for accurately cutting elongate material into predetermined lengths during intermittent longitudinal advancement of the material.

With this and other objects in view, the invention comprises an apparatus for cutting elongate material into predetermined lengths including a rotor driven about its axis, means to guide a material longitudinally in a path adjacent the periphery of the rotor, a cutting blade and a rocking element mounted in the rotor to support the blade therein whereby the blade will be held in a given position in its circuitous path until it strikes the material with its cutting edge, yielding means allowing rocking movement of the blade with its element to cause the blade to shear the material in two.

More specifically, the apparatus includes diametrically opposed rocking elements, in the rotor, individually urged into their normal positions by spring pressed plungers against stops, the plungers being depressed when their respective cutting blades engage materials causing rocking movement of the elements with the blades, moving the blades in shearing actions relative to the materials to accurately cut predetermined lengths from the materials. A stator is mounted concentric with the rotor and composed mainly of two parts spaced a given distance from each other providing an annular guide for the cutting blades, holding the blades against buckling during the cutting operations. Guides for the materials include apertures through the spaced stator members whereby the portions of the materials adjacent the cutting path will be supported prior to and during the cutting operations.

Other objects and advantages will be apparent from the following detailed description when considered in conjunction with the accompanying drawings, wherein:

Fig. 1 is a horizontal sectional view of the apparatus;

Fig. 2 is a vertical sectional view taken substantially along the line 2—2 of Fig. 1;

Fig. 3 is a fragmentary sectional view taken along the line 3—3 of Fig. 2;

Fig. 4 is a vertical sectional view through the rotor, a portion of the stator being broken away;

Fig. 5 is an enlarged fragmentary sectional view taken along the line 5—5 of Fig. 2; and Fig. 6 is a fragmentary sectional view taken along the line 6—6 of Fig. 4.

Referring now to the drawings, attention is first directed to Fig. 1 which illustrates a base 10 upon which bearing brackets 11 and 12 are mounted. The bearing brackets 11 and 12 house suitable bearings for a drive shaft 14 which supports a rotor 15 keyed to the shaft for rotation therewith. A stator unit 16 includes bearings 17 interposed between the bearing brackets 11 and 12 to assist in supporting the shaft closely adjacent the rotor 15. The shaft 14 is driven from a power source (not shown) through a belt 18 and a pulley 19, the latter being fixedly mounted upon the shaft. A guide unit 21 including guide sleeves 22 is mounted upon the stator unit 16 to receive materials 25 as they are advanced longitudinally predetermined distances determined by variable stops 26 mounted in the paths of the materials 25.

In the present embodiment of the invention, the stops 26 are adjustable screws threadedly disposed in apertures of brackets 27 and provided with knurled heads 28 by the aid of which the screws may be adjusted relative to the stator unit to vary the lengths of the portions cut from the materials 25. In actual practice, a more complicated structure may be employed to serve as stops for the materials including a mechanism to move the stops away from the materials during the cutting operations to allow the portions cut from the materials to move longitudinally and be ejected from the stator unit after the cutting operations have been completed. Hoppers or chutes 30 are positioned beneath the adjustable stops 26 to receive the portions cut from the materials 25.

The rotor is shown more in detail in Figs. 2 to 5, inclusive. It will be noted that diametrically opposed apertures 33 are formed in the rotor 15 to receive rocking elements 34 which are identical in structure. The rocking elements are cylindrical in general contour and have diametrically opposed arcuate grooves 36 in their peripheries to receive the inner ends 37 of stop screws 38 mounted in pairs of aligned threaded apertures 39 in the rotor 15. The stop screws serve also to maintain the rocking elements against lateral displacement in the rotor. Spring pressed plungers 40 slidable in parallel apertures 41 in the rotor 15 are positioned to engage shoulders 42 of cutaway portions 43 in the rocking elements 34 to normally urge the elements counterclockwise about their axes distances limited by their stops 38 and hold the rocking elements in their normal positions.

As shown more in detail in Fig. 5, the rocking elements 34 have parallel apertures 44 to receive rods 45 which are rigidly held in position in the rocking elements by pins 46 extending through apertures in the rocking elements and through aligned apertures in their respective rods 45. The rods 45 of each rocking element are of the proper size and suitably positioned to receive the standard double edge razor blade 50 which hereinafter will be described as the cutting blade. Clamping elements 51 have spaced apertures therein to receive the rods 45 of their element and is held firmly in place on the rods by nuts 52 disposed upon the threaded ends of the rods. The rocking elements 34 were described as being urged into their normal positions by spring pressed plungers 40 disposed in apertures 41 of the rotor 15. Springs 54 back of the plungers 40 are compressed by the aid of screws 55 disposed in the threaded ends of the apertures 41 and adjustable therein to vary the forces of the springs applied to the plungers 40.

The stator unit 16 includes a main member 60 which is annular in general contour with the exception of the lower portion 61, this portion extending downwardly and being fixedly mounted upon the base 10. It will be noted by viewing Fig. 2 that the hoppers 30, particularly the upper portions thereof partially conform to the member 60 as at 62 to readily receive the portions cut from the materials 25. The member 60 has annular recesses 63 at diametrically opposed positions with pairs of material guiding apertures 64 and 65 of different sizes therein which are selectively disposed in alignment with the material guides 22. The member 60 is also apertured at 67 to support the material upon one side of the path of the cutting blades 50.

A companion member 66, of the stator, annular in general contour has spaced apertures 68 to receive locating pins 69 shown in detail in Fig. 6 to accurately locate the member 66 with respect to the member 60. The pins 69 are firmly held in apertures of the main member 60. Threaded apertures 70 (Fig. 3) disposed at spaced positions in the member 60 have annular recesses 71 about the outer ends thereof to receive washers 72 which serve as spacers to accurately position the member 66 a given distance from the member 60. Suitable apertures 73 are formed in the member 66 to receive the thumb screws 74 to removably secure the member 66 in place against the washers 72 providing an annular guide 78 between the members of a given width sufficient for the cutting blades 50 and to hold the cutting blades against buckling during cutting operations. Two pairs of apertures 80 and 81 differing in size are formed in the member 66 for selective positioning in registration with their respective apertures 64 and 65 depending upon the diameters of the material 25 being advanced through the apertures. These pairs of apertures allow for materials of different sizes to be fed through the apparatus and thereby be cut into portions of predetermined lengths.

Considering now the operation of the apparatus, let it be understood that the apparatus is set to receive like materials 25 of a given size and that suitable means is provided to advance these materials longitudinally against the adjustable stops 26 which have been previously set given distances from the path of the cutting blades depending upon the lengths of the portions to be cut from the materials. It will be apparent that the stops 26 may be positioned like or different distances from the member 26 or the path of the cutting blades to cut portions of different lengths from their respective materials.

The apparatus may be put in operation by causing rotation of the shaft 14 to rotate the rotor 15, moving the rocking elements with their blades through a circuitous path controlled by the stator 16. The actions of the rocking elements and their blades are identical. To simplify the description of these elements, the sequence of operation of one rocking element and its blade will be described and this description will apply equally well to the other rocking element and cutting blade. Consider for example, the rocking element and cutting blade near the top of Fig. 2, as it travels in a counterclockwise direction toward the material 25 at the left of this figure. The position of the cutting blade and its rocking element are shown in broken lines as the cutting blade first engages the material. The cutting edge of the cutting blade is in a position which is substantially radially with respect to the axis of the rotor as the initial cut is made on the material. The resistance of the material against the cutting blade will cause the blade with its rocking element to be rocked into the position shown at the left of Fig. 4, forcing the rocking element into its operating position against the force of the spring 54 applied to its plungers 40, whereby the cutting edge of the blade will be positioned to shear the remainder of the thickness of the material. As soon as the cutting has been completed through the material, the cutting blade and the rocking element are urged into their normal positions by the spring pressed plunger where they remain until the cutting blade reaches the other material 25 at the right of Fig. 4, at which time a similar operation takes place. The cutting blade first strikes this material in a lateral position with respect to its path of movement beginning its cut through the material, the resistance of the material causing rocking motion to be applied to the cutting blade and rocking element against the force of the spring pressed plungers. During this rocking motion, a second cutting action occurs, after which a shearing action takes place completing the cut through the material. This operation is completed, both materials having portions cut therefrom by each blade during each rotation of the rotor, the stator forming a guided path for both blades supporting them during the cutting operations against buckling whereby the thin razor blade types of cutters may be employed to perform the cutting operations while the cutting blades as well as the material being cut will be supported upon both sides of the path of the blade.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for cutting elongate material into predetermined lengths comprising a rotor driven about its axis, a blade having a cutting edge, a holder for the blade, pivoted means mounting the holder for rocking movement about its axis on the rotor adjacent the periphery thereof and to move in a circular path with the rotor, a stator having annular members, aligned material receiving apertures therein, disposed closely adjacent the sides of the path of the blade concentric with the rotor to maintain the blade against flexing, the apertures holding the material on opposite sides of the path, means to limit rocking movement of the holder to an area between its normal position, when the cutting edge of the blade will extend substantially radially of the axis of the rotor, and its operated position when the cutting edge of the blade will have moved through increasingly variable shearing positions of increased angles from the normal position of the cutting edge, and means applying a force to the holder which is sufficient to position the blade in its normal position when first engaging the material but insufficient to withstand the resistance of the material against the blade to cause the blade to rock with the holder into its various shearing positions to shear a length from the material.

2. An apparatus for cutting elongate material into predetermined lengths comprising a rotor driven about its axis and having an aperture therein adjacent its periphery, a blade having a cutting edge, a holder for the blade having a cylindrical portion receivable in the aperture of the rotor whereby the holder and blade will be rockable relative to the rotor while rotating therewith, a stator having annular members, with aligned material receiving apertures therein, disposed closely adjacent the sides of the path of the blade concentric with the rotor to maintain the blade against flexing, the apertures holding the material on opposite sides of the path, means to limit rocking movement of the holder to an area between its normal position, when the cutting edge of the blade will extend substantially radially of the axis of the rotor, and its operated position when the cutting edge of the blade will have moved through increasingly variable shearing positions of increased angles from the normal position of the cutting edge, and means applying a force to the holder which is sufficient to position the blade in its normal position when first engaging the material but insufficient to withstand the resistance of the material against the blade to cause the blade to rock with the holder into its various shearing positions to shear a length from the material.

NICHOLAS ZUCK.

REFERENCES CITED

The following references are of record in the file of this patent:

UNITED STATES PATENTS

| Number | Name | Date |
|---|---|---|
| 583,002 | Satterwhite | May 18, 1897 |
| 633,865 | Linkiewicz | Sept. 26, 1899 |
| 1,297,203 | McGunigal | Mar. 11, 1919 |
| 1,603,859 | Midgley | Oct. 19, 1926 |
| 2,398,230 | Keller | Apr. 19, 1946 |
| 2,466,587 | Genovese | Apr. 5, 1949 |